United States Patent
Woloszczuk

(10) Patent No.: US 9,744,688 B2
(45) Date of Patent: Aug. 29, 2017

(54) TILE CUTTING AND DUST COLLECTION SYSTEM

(71) Applicant: Luke Woloszczuk, Mount Hope (CA)

(72) Inventor: Luke Woloszczuk, Mount Hope (CA)

( * ) Notice: Subject to any disclaimer, the term of this patent is extended or adjusted under 35 U.S.C. 154(b) by 22 days.

(21) Appl. No.: 14/920,187

(22) Filed: Oct. 22, 2015

(65) Prior Publication Data

US 2016/0114499 A1    Apr. 28, 2016

Related U.S. Application Data

(60) Provisional application No. 62/067,597, filed on Oct. 23, 2014.

(51) Int. Cl.
| | | |
|---|---|---|
| *B23Q 3/00* | (2006.01) |
| *B28D 7/02* | (2006.01) |
| *B28D 7/04* | (2006.01) |
| *B25B 11/00* | (2006.01) |
| *A47L 9/16* | (2006.01) |
| *B04C 5/13* | (2006.01) |
| *B04C 5/06* | (2006.01) |
| *B04C 5/26* | (2006.01) |
| *B01D 45/12* | (2006.01) |

(52) U.S. Cl.
CPC .............. *B28D 7/02* (2013.01); *A47L 9/1641* (2013.01); *B01D 45/12* (2013.01); *B04C 5/06* (2013.01); *B04C 5/13* (2013.01); *B04C 5/26* (2013.01); *B25B 11/005* (2013.01); *B28D 7/04* (2013.01); *Y10S 55/03* (2013.01)

(58) Field of Classification Search
USPC ....................... 269/14; 15/301, 314, 331, 339
See application file for complete search history.

(56) References Cited

U.S. PATENT DOCUMENTS

| | | | | |
|---|---|---|---|---|
| 4,063,478 A | * | 12/1977 | Stuy ...................... | B23D 59/006 144/252.1 |
| 4,068,648 A | * | 1/1978 | Erdman ................. | B28D 1/047 125/13.01 |
| 4,433,835 A | * | 2/1984 | Wheeler ............... | B25B 11/005 269/14 |
| 4,576,072 A | * | 3/1986 | Terpstra ............... | B23D 47/025 83/100 |
| 5,131,192 A | * | 7/1992 | Cheng ................... | A61C 3/025 144/252.2 |
| 5,289,861 A | * | 3/1994 | Hedrick ................. | B23Q 9/00 144/134.1 |

(Continued)

FOREIGN PATENT DOCUMENTS

| | | | | |
|---|---|---|---|---|
| DE | 102009054083 B3 | * | 5/2011 | ............. B28D 1/044 |
| DE | EP 2511061 A1 | * | 10/2012 | ............. B28D 1/044 |
| HK | DE 102005020400 A1 | * | 11/2006 | ........... A47L 9/1641 |

*Primary Examiner* — Larry E Waggle, Jr.
*Assistant Examiner* — Alvin Grant

(57) ABSTRACT

The present concept is a cutting surface and debris container in combination with a vacuum cleaner. The cutting surface and debris container includes a hollow container with a debris storage compartment, and a cutting surface for supporting a workpiece to be cut. The cutting surface has an opening to allow fresh air to be drawn into the container. The top section of the container has an outlet that can connect to a hose which couples the container to a vacuum cleaner. Debris generated from cutting the workpiece is drawn into the container. Large debris particles drop in the debris storage compartment while small particles are extracted by the vacuum cleaner.

8 Claims, 3 Drawing Sheets

(56) References Cited

U.S. PATENT DOCUMENTS

| | | | | |
|---|---|---|---|---|
| 6,183,527 B1* | 2/2001 | O'Banion | A47L 5/365 | 15/347 |
| 6,470,778 B1* | 10/2002 | Kaye, Jr. | B23D 59/006 | 144/252.1 |
| 6,503,125 B1* | 1/2003 | Harrington | B24B 55/06 | 451/28 |
| 6,948,412 B2* | 9/2005 | Brazell | B23D 59/006 | 144/252.2 |
| 7,905,260 B2* | 3/2011 | Keenan | B23Q 11/0046 | 144/252.1 |
| 8,561,512 B2* | 10/2013 | Loveless | B23D 59/006 | 83/100 |
| 8,967,729 B1* | 3/2015 | Farris | E01C 23/0885 | 299/39.3 |
| 2003/0213482 A1* | 11/2003 | Buser | B23Q 11/0046 | 125/12 |
| 2004/0206220 A1* | 10/2004 | Keenan | B23D 59/006 | 83/100 |
| 2005/0034715 A1* | 2/2005 | Terpstra | B23Q 11/0046 | 125/13.01 |
| 2005/0166736 A1* | 8/2005 | Gass | B23D 45/067 | 83/477.2 |
| 2006/0201295 A1* | 9/2006 | Jorgensen | B23D 59/006 | 83/100 |
| 2007/0074612 A1* | 4/2007 | Yu | B23D 45/068 | 83/477.2 |
| 2008/0011138 A1* | 1/2008 | Brazell | B23D 59/006 | 83/100 |
| 2008/0060631 A1* | 3/2008 | Dofher | B28D 7/02 | 125/13.01 |
| 2009/0236900 A1* | 9/2009 | Due | B28D 7/02 | 299/39.3 |
| 2010/0058911 A1* | 3/2010 | Goddard | B23D 59/006 | 83/478 |
| 2010/0116261 A1* | 5/2010 | Fairweather | B23Q 11/0046 | 125/13.01 |
| 2011/0079207 A1* | 4/2011 | Guth | B23D 45/16 | 125/13.01 |
| 2011/0278907 A1* | 11/2011 | Moller | E01C 23/088 | 299/18 |
| 2012/0036972 A1* | 2/2012 | Frolov | B23D 59/006 | 83/168 |
| 2012/0285308 A1* | 11/2012 | Koegel | B23D 59/006 | 83/168 |
| 2014/0224237 A1* | 8/2014 | Ronzello, Sr. | B28D 7/02 | 125/13.01 |
| 2014/0273774 A1* | 9/2014 | Pino | B28D 7/02 | 451/456 |
| 2015/0246461 A1* | 9/2015 | Bourget | B28D 1/045 | 125/14 |

* cited by examiner

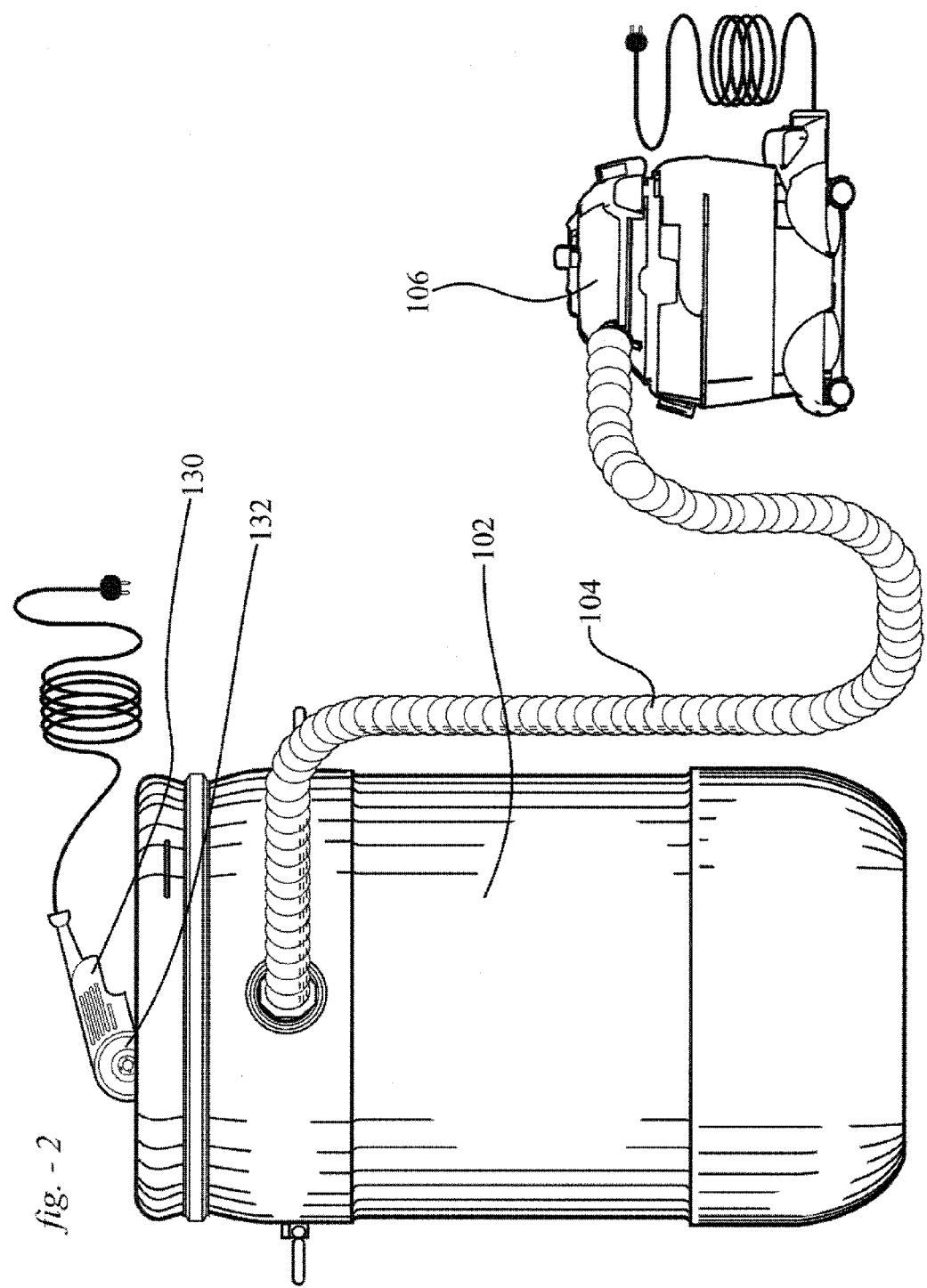

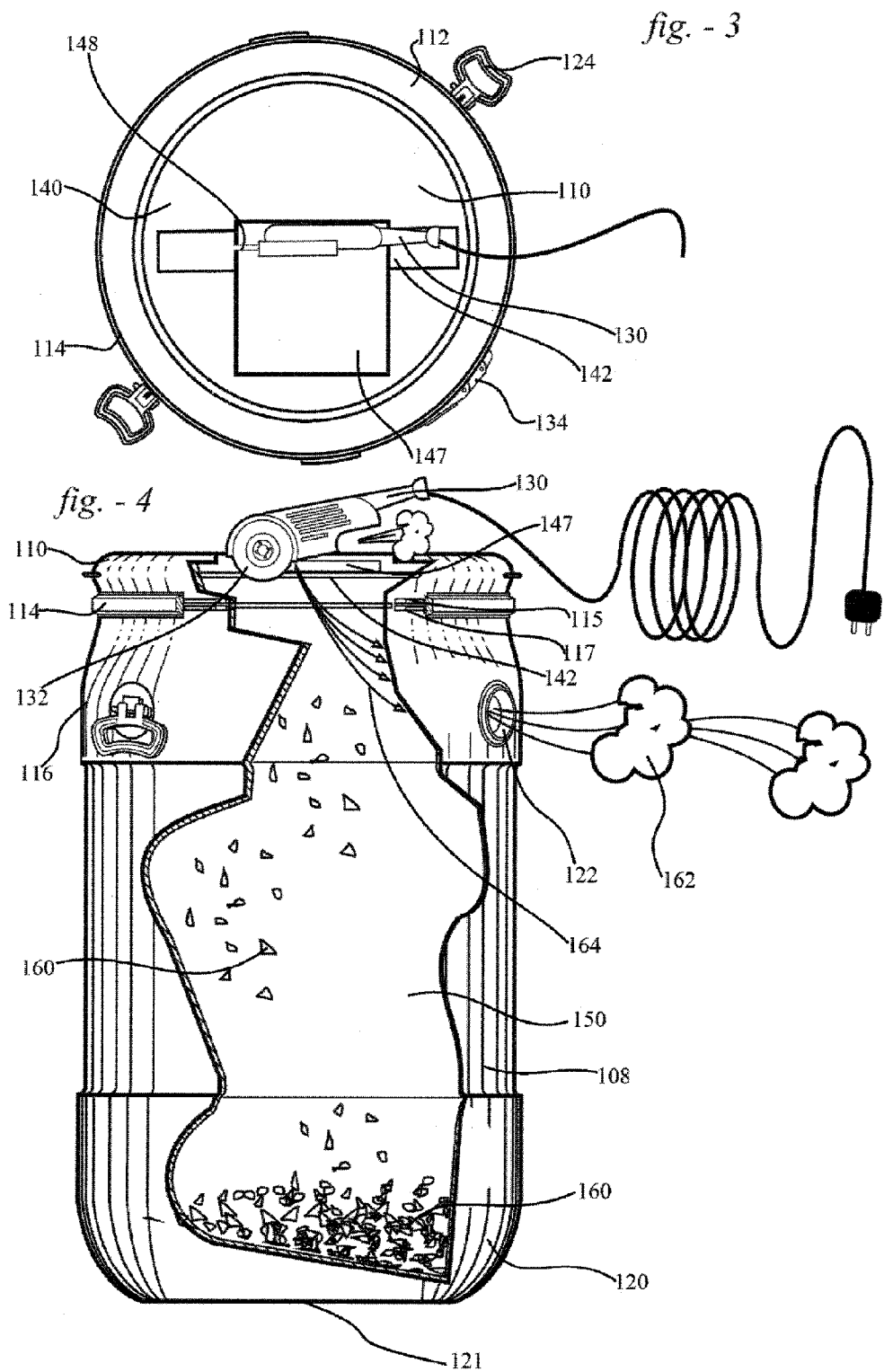

TILE CUTTING AND DUST COLLECTION SYSTEM

This application claims priority from the previously filed provisional application No. 62/067,597, filed on Oct. 23, 2014 by Luke Woloszczuk under the title: TILE CUTTING AND DUST COLLECTION SYSTEM.

FIELD OF THE INVENTION

The present concept relates to a system for tile cutting and dust collection and more particularly relates to any portable system of tile cutting and dust collection.

BACKGROUND OF THE INVENTION

The installation of ceramic and/or other porcelain tile and/or other hard flooring materials such as slate or granite inevitably leads to the cutting of these materials in order to fit them into specific locations.

There are a number of methods of cutting tile including wet cut-off saws and also dry cut-off saws. In practice the wet cut-off saws tend to be significantly slower and more cumbersome than the dry cut-off saws however the dry cut-off saws tend to create a lot of dust. In this application dry cut-off saws are referred to as motorized cutting tools which come in various shapes and sizes and have the ability to have mounted thereon various sized cutting wheels.

The drawback with using a dry motorized cutting tool is the amount of debris and dust that is generated which is particularly undesirable in interior locations such as residential homes and/or commercial buildings.

In addition there is a safety aspect of the dust particles generated from cutting of tile and it is highly undesirable to inhale the dust and particles which are generated when tile is cut using dry motorized cutting tools.

Therefore there is a need for a device which is able to control the release of dust and particulate matter when cutting tile and which is portable and has the ability to easily be moved from one job site to another.

SUMMARY OF THE INVENTION

The present concept is a combination of a cutting surface, debris container and vacuum cleaner. The combination comprises
a) a hollow container defining a substantially enclosed debris storage compartment;
b) the container includes a bottom support surface spaced from an elevated planar cutting surface, the cutting surface for supporting a work piece to be cut;
c) an elongated opening in the cutting surface for placing the work piece there across and for allowing fresh air to be drawn into the container;
d) an outlet within a top section of the container, the outlet for coupling one end of a vacuum hose to the container;
e) the other end of the hose coupled to vacuum cleaner;
f) such that upon cutting the work piece debris generated from the cutting is drawn into the container and large particles drop to the bottom support surface and fine particles are extracted out of the container by the vacuum cleaner.

Preferably wherein the cutting surface is the horizontal portion of a container lid, wherein the lid is detachable from a body of the container.

Preferably wherein the lid includes a lid flange and the body includes a body flange for clamping together the lid and the body with a band.

Preferably wherein the band is U shaped for positioning over both the lid flange and the body flange.

Preferably wherein the band includes a clamp for tensioning and locking the band in position over the body and lid flanges.

Preferably wherein the container further includes at least two handles mounted on the top section of the body for grasping and moving the container by hand.

Preferably wherein the elongated opening is a rectangular slot having a length at least ten times the width.

Preferably wherein the elongated opening is a rectangular slot having a length at least five times the width.

Preferably wherein the container is a vertical upstanding tube with circular lid and circular bottom support surface.

BRIEF DESCRIPTION OF THE DRAWINGS

FIG. 2 is a schematic assembly view of the tile cutting and dust collection system together with a motorized cutting tool.

FIG. 3 is a top plan view of the cutting surface showing a tile being cut by a motorized cutting tool.

FIG. 4 is a schematic partial cutaway view of the container showing a motorized cutting tool cutting a tile and the flow of dust and particulate debris within the container.

DETAILED DESCRIPTION OF THE PREFERRED EMBODIMENT

Figure 1:
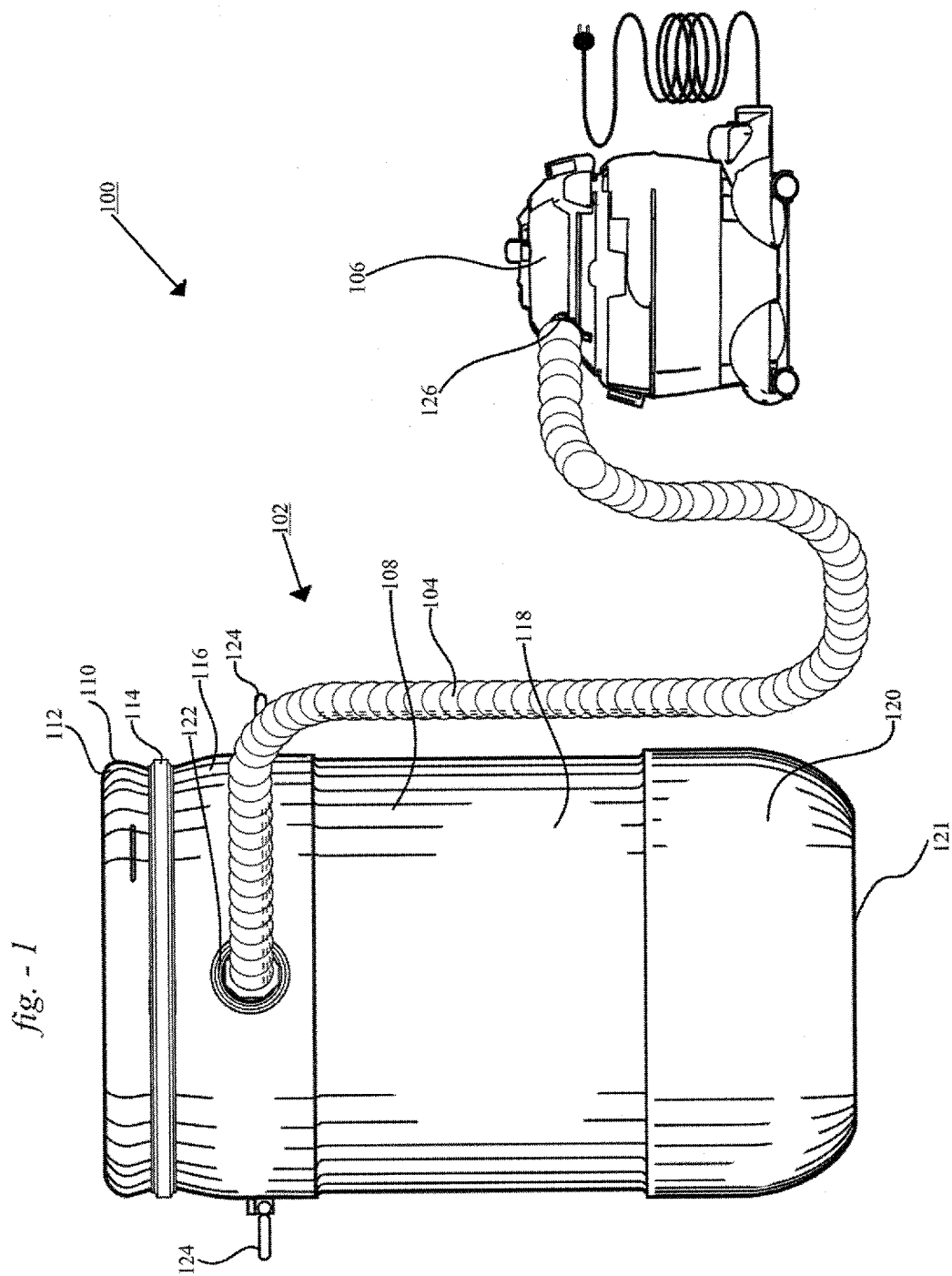
FIG. 1 is a schematic diagram of the tile cutting and dust collection system showing the major components, namely the container, the vacuum cleaner, and the connecting hose.

The present concept a tile cutting and dust collection is shown generally as 100 in the Figures.

Referring now to FIG. 1 in particular the tile cutting and dust collection system 100 includes the following major components namely a cutting surface and debris container 102, a hose 104, and a vacuum cleaner 106. The hose 104 connects container 102 to vacuum cleaner 106.

The cutting surface and debris container 102 includes a body 108 which is hollow having a lid 110 with a rim 112 which clamps onto to body 108 with a U-shaped band 114. U-shaped band 114 engages with a lid flange 115 on lid 110 and body flange 117 on body 108 to lock the body 108 and lid 110 together. Lid flange 115 and body flange 117 are depicted in FIG. 4. Cutting surface and debris container 102 further includes a top section 116, a mid-section 118, and a bottom section 120. Bottom section 120 has a bottom support surface 121 that rests on the floor surface. Top section 116 includes an outlet 122 and also includes handles 124. Vacuum cleaner 106 includes an inlet 126 which hose 104 is connected to.

Vacuum cleaner 106 may be of any type that can be purchased on the open market however preferably is of the shop-vac style which is able to handle very fine dust and particulate matter.

Vacuum cleaner 106 supplies a vacuum to body 108 of cutting surface and debris container 102 thereby extracting air, dust and potentially particulate matter out of cutting surface and debris container 102 through the suction created by vacuum 106.

Referring now to FIG. 2 which shows in combination with the cutting surface and debris container 102 a motorized cutting tool 130 having a cutting wheel 132 for cutting tile.

FIG. 3 is a top plan view of the lid 110 which is connected to the body 108 of container 102 with a U-shaped band 114 and a clamp 134.

Lid 110 which includes a rim 112 and a cutting surface 140 having an opening defined therein 142.

FIG. 3 depicts a motorized cutting tool 130 and a workpiece 147 placed on the cutting surface 140 and in the process of making a cut 148 along workpiece 147.

FIG. 4 shows a schematic partial cutaway view of body 108 of tile cutting and dust collection system 100 together with a cutting tool 130 shown cutting a workpiece 147 which is placed across opening 142 such that cutting wheel 132 may actually protrude into the inner storage compartment 150 of cutting surface and debris container 102 as workpiece 147 is being cut.

FIG. 4 shows particulate debris 160 falling to the bottom section 120 of body 108 where it is collected for future disposal.

In addition to larger and heavier particulate debris 160, very fine dust 162 is released when cutting workpiece 147 with motorized cutting tool 130 as schematically shown in FIG. 4.

The connection of hose 104 and vacuum cleaner 106 is not shown in FIG. 4 however dust flow 164 is shown as if hose 104 and vacuum cleaner 106 were connected.

The vacuum created by vacuum cleaner 106 draws any very fine dust 162 out through outlet 122 of the top section 116 of cutting surface and debris container 102 and out through hose 104 and into vacuum cleaner 106.

The dust is collected into a normal vacuum bag and filtration system found in vacuum cleaner 106 and clean air is discharged from vacuum cleaner 106.

The reader will note that the heavier particulate debris 160 is collected in the bottom section 120.

The outlet 122 for the lighter dust 162 is found in the top section 116 of cutting surface and debris container 102.

Air is drawn into opening 142 found in the cutting surface 140 of lid 110. This air is drawn into opening 142 along with any dust 162 which may be created by cutting wheel 132 and is drawn out through outlet 122 found in the top section 116 of cutting surface and debris container 102.

In this manner the very fine dust particles eventually find their way into vacuum cleaner 106 and the heavier particulate debris 160 finds its way to the bottom section 120 of body 108.

The reader will note that cutting surface and debris container 102 serves two functions namely as a cutting table which includes a cutting surface 140 wherein a workpiece 147 can be placed thereon for cutting.

As shown in FIG. 3 a workpiece 147 is placed on a cutting surface 140 and the cut 148 is positioned over opening 142 in order to maximize the collection of dust 162 and particulate debris 160 into the cutting surface and debris container 102 and out through outlet 122 or into the bottom section 120 of body 108.

The height of the cutting surface and debris container 102 can be selected such that it is at a comfortable level for tile cutters which can either be for cutting in a standing position or in the kneeling position depending upon the height of the cutting surface and debris container 102.

It should be apparent to persons skilled in the arts that various modifications and adaptation of the structure described above are possible without departure from the spirit of the invention the scope of which is defined in the appended claim.

I claim:

1. In combination a cutting surface and debris container and vacuum cleaner, the combination comprises;
    a) a hollow container defining a substantially enclosed debris storage compartment;
    b) the container includes a bottom support surface spaced from an elevated planar cutting surface, the cutting surface for supporting a work piece to be cut;
    c) an elongated opening in the cutting surface for placing the work piece there across and for allowing fresh air to be drawn into the container;
    d) an outlet within a top section of the container, the outlet for coupling one end of a vacuum hose to the container;
    e) an other end of the hose coupled to a vacuum cleaner;
    f) such that upon cutting the work piece debris generated from the cutting is drawn into the container and large particles drop to the bottom support surface and fine particles are extracted out of the container by the vacuum cleaner and,
    g) wherein the cutting surface is a horizontal portion of a container lid, wherein the lid is detachable from a body of the container.

2. The combination claimed in claim 1 wherein the lid includes a lid flange and the body includes a body flange for clamping together the lid and the body with a band.

3. The combination claimed in claim 2 wherein the band is U shaped for positioning over both the lid flange and the body flange.

4. The combination claimed in claim 3 wherein the band includes a clamp for tensioning and locking the band in position over the body and lid flanges.

5. The combination claimed in claim 1 wherein the container further includes at least two handles mounted on the top section of the container for grasping and moving the container by hand.

6. The combination claimed in claim 1 wherein the elongated opening is a rectangular slot having a length at least ten times the width.

7. The combination claimed in claim 1 wherein the elongated opening is a rectangular slot having a length at least five times the width.

8. In combination a cutting surface and debris container and vacuum cleaner, the combination comprises;
    a) a hollow container defining a substantially enclosed debris storage compartment;
    b) the container includes a bottom support surface spaced from an elevated planar cutting surface, the cutting surface for supporting a work piece to be cut;
    c) an elongated opening in the cutting surface for placing the work piece there across and for allowing fresh air to be drawn into the container;
    d) an outlet within a top section of the container, the outlet for coupling one end of a vacuum hose to the container;
    e) an other end of the hose coupled to a vacuum cleaner;
    f) such that upon cutting the work piece debris generated from the cutting is drawn into the container and large particles drop to the bottom support surface and fine particles are extracted out of the container by the vacuum cleaner and,
    g) wherein the container is a vertical upstanding Tube with circular lid and circular bottom support surface.

* * * * *